(12) United States Patent
Yang et al.

(10) Patent No.: US 12,193,365 B2
(45) Date of Patent: Jan. 14, 2025

(54) BACKPACK BLOWER, BACKPACK ASSEMBLY AND BACKPACK POWER ASSEMBLY

(71) Applicant: Greenworks (Jiangsu) Co., Ltd., Changzhou (CN)

(72) Inventors: Xudong Yang, Changzhou (CN); Yabin Tang, Changzhou (CN); Yunjie Shangguan, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 0 days.

(21) Appl. No.: 18/313,377

(22) Filed: May 8, 2023

(65) Prior Publication Data

US 2023/0270058 A1    Aug. 31, 2023

Related U.S. Application Data

(63) Continuation of application No. PCT/CN2021/128021, filed on Nov. 2, 2021.

(30) Foreign Application Priority Data

Nov. 17, 2020    (CN) .......................... 202022659734.4
Jan. 4, 2021    (CN) .......................... 202120002942.9

(51) Int. Cl.
*A01G 20/47*    (2018.01)
*F04D 25/06*    (2006.01)
(Continued)

(52) U.S. Cl.
CPC .......... *A01G 20/47* (2018.02); *F04D 25/0673* (2013.01); *F04D 25/082* (2013.01); *F04D 29/664* (2013.01)

(58) Field of Classification Search
CPC ............................ A01G 20/47; F04D 25/0673
See application file for complete search history.

(56) References Cited

U.S. PATENT DOCUMENTS 9,555,537 B2 *    1/2017    Iwata .................. B26B 21/4056
10,736,403 B2 *    8/2020    Yamaoka .................. B25F 5/02
(Continued)

FOREIGN PATENT DOCUMENTS

CN    204538894 U    8/2015
CN    105485033 A    4/2016
(Continued)

*Primary Examiner* — Courtney D Heinle
*Assistant Examiner* — Danielle M. Christensen

(57) ABSTRACT

The disclosure provides a backpack blower, a backpack assembly and a backpack power assembly. The backpack blower includes a backpack assembly and a blower body. The backpack assembly is used for an operator to carry and comprises a battery pack cavity to house a battery pack. The blower body is mounted on the backpack assembly. The battery pack supplies power to the blower body. The blower body includes a motor duct assembly, an air inlet assembly assembled and fixed with the backpack assembly, and an air outlet assembly connected with the air inlet assembly. The air inlet assembly includes an air inlet and an air inlet tube connected to the air inlet. The air inlet tube is connected with the air outlet assembly. The motor duct assembly is housed in the air outlet assembly.

20 Claims, 15 Drawing Sheets

(51) Int. Cl.
*F04D 25/08* (2006.01)
*F04D 29/66* (2006.01)

(56) References Cited

U.S. PATENT DOCUMENTS

| | | | |
|---|---|---|---|
| 10,980,193 B2 * | 4/2021 | Shangguan | F04D 27/004 |
| 2010/0320969 A1 | 12/2010 | Sakakibara et al. | |
| 2014/0011061 A1 | 1/2014 | Yoshinari et al. | |
| 2015/0228940 A1 | 8/2015 | Fujisawa | |
| 2015/0377253 A1 | 12/2015 | Shibata et al. | |
| 2019/0045725 A1 | 2/2019 | Shangguan et al. | |
| 2023/0032953 A1 * | 2/2023 | Jarmesta | A47L 9/2884 |

FOREIGN PATENT DOCUMENTS

| | | |
|---|---|---|
| CN | 105952672 A | 9/2016 |
| CN | 110754015 A | 2/2020 |
| CN | 213808160 U | 7/2021 |
| CN | 213988993 U | 8/2021 |
| WO | 2013139409 A1 | 9/2013 |
| WO | 2019206581 A1 | 10/2019 |

\* cited by examiner

BACKPACK BLOWER, BACKPACK ASSEMBLY AND BACKPACK POWER ASSEMBLY

TECHNICAL FIELD

The disclosure relates to a backpack blower, a backpack assembly and a backpack power assembly, which belongs to the technical field of blowers.

BACKGROUND

In the conventional backpack blower, the motor, fan and PCB board are all located under the backpack, and the parts are compactly arranged, which is not beneficial for heat dissipation. Therefore, when the backpack blower is working, the blown air flow needs to pass through the elbow and the bellows, and then be blown out by the blowing tube. The loss of air speed and air volume is relatively large, and the noise is relatively large.

Moreover, conventionally, various types of cleaning devices, garden tools, etc. have been commonly used in daily life. Common cleaning devices and garden tools on the market, such as hand-held vacuum cleaners, hand-held blowers, etc., are more and more widely known by consumers, and they are widely loved by users because of their lightness, portability, and no need for power cords during use.

In order to facilitate the users to use and avoid that the users feel heavy, the battery pack of the hand-held tool is usually small, so that the battery endurance is limited. Therefore, a backpack-type battery pack is used to supply power for the hand-held tool. In this way, not only can the user's arm burden be reduced, but also the endurance can be effectively improved.

However, because of the high power and high current of the backpack blower, the battery pack has a high temperature during discharge, which leads to incomplete discharge of the battery pack.

SUMMARY

The disclosure provides a backpack blower, the backpack blower can not only effectively reduce the noise, but also has higher air outlet efficiency, and the loss of air speed and air volume is small.

The disclosure provides a backpack blower, the backpack blower includes a backpack assembly and a blower body. The backpack assembly is used to be carried by an operator, and includes a battery pack cavity, used to house a battery pack. The blower body is mounted on the backpack assembly. The battery pack supplies power to the blower body. The blower body includes a motor duct assembly, an air inlet assembly mounted on the backpack assembly, and an air outlet assembly connected with the air inlet assembly, the air inlet assembly includes an air inlet and an air inlet tube connected to the air inlet, the air inlet tube is connected with the air outlet assembly, the motor duct assembly is housed in the air outlet assembly.

In an embodiment of the backpack blower of the disclosure, the motor duct assembly includes a duct body, a motor mounted inside the duct body, a guiding cone and a fan blade, the guiding cone is mounted and matched with one end of the duct body, the fan blade is mounted and matched with the other end of the duct body, and the fan blade is fixedly mounted on the motor shaft of the motor.

In an embodiment of the backpack blower of the disclosure, the air outlet assembly includes a housing assembly, a bellows, an air outlet tube fixedly connected to the bellows, and a handle assembly mounted on the air outlet tube, the housing assembly is connected with the air inlet tube, and the bellows is connected with the housing assembly.

In an embodiment of the backpack blower of the disclosure, an inner tube is arranged in the housing assembly, a part of the motor duct assembly is housed in the inner tube, and the other part of the motor duct assembly is housed in the bellows, one end of the duct body mounted with the fan blade is connected with the inner tube, the fan blade is arranged in the inner tube, and one end of the duct body mounted with the guiding cone is arranged in the bellows.

In an embodiment of the backpack blower of the disclosure, the motor duct assembly and the inner tube are housed in the housing assembly, the inner tube is bent, the housing assembly is correspondingly bent, one end of the housing assembly is threadedly connected with the air inlet tube, and the other end extends into the bellows and is fixedly connected with the bellows.

In an embodiment of the backpack blower of the disclosure, the motor duct assembly is housed in the air outlet tube and located below the handle assembly, and the fan blade is arranged close to the bellows.

In an embodiment of the backpack blower of the disclosure, the air outlet tube includes a first air outlet tube and a second air outlet tube that are assembled and matched with each other, the motor duct assembly is housed in a receiving cavity surrounded and defined by the first air outlet tube and the second air outlet tube, the handle assembly includes a first handle and a second handle that are assembled and matched with each other, the first handle is clamped on the first air outlet tube, and the second handle is clamped on the second air outlet tube.

In an embodiment of the backpack blower of the disclosure, the air outlet assembly further includes a blowing tube connected with the air outlet tube, a ratio of a cross-sectional area of a free end of the blowing tube to a cross-sectional area of the duct body is less than 0.8, and a cross-sectional area of one end of the bellows close to the air outlet tube is smaller than a cross-sectional area of the other end of the bellows.

In an embodiment of the backpack blower of the disclosure, the battery pack is located above the air inlet assembly and is carried on a back of an operator through the backpack assembly.

In an embodiment of the backpack blower of the disclosure, a noise reduction sponge is arranged on an inner side wall of the air inlet tube to reduce noise when air enters, the power assembly includes a battery pack and a circuit board located below the battery pack, a heat dissipation hole is arrange on a top wall of the air inlet tube, and the heat dissipation hole is arranged corresponding to the circuit board, so as to dissipate heat generated during an operation of the circuit board through the heat dissipation hole.

In an embodiment of the backpack blower of the disclosure, the blower body is provided with an input port, and the backpack assembly is provided with a power output port which is matched with the input port.

In an embodiment of the backpack blower of the disclosure, the blower body is further provided with an operating handle and a display unit on the operating handle, the backpack assembly is further provided with an information acquisition unit, and the information acquisition unit is used to obtain power information of the battery pack and display the power information on the display unit through a match of the input port and the power output port.

The disclosure further provides a backpack assembly, the backpack assembly includes a box body and a heat dissipation fan. The box body is provided with a first air channel communicating with the outside and a plurality of battery cavities located around the first air channel, the battery cavities is provided with a first heat dissipation hole and a second heat dissipation hole which corresponds to the first heat dissipation hole and communicates with the first air channel. The heat dissipation fan drives air to flow into the battery cavities from one of the first heat dissipation hole and the first air channel, and flow out of the battery cavity from the other one of the first heat dissipation hole and the first air channel.

In an embodiment of the backpack assembly of the disclosure, the number of the heat dissipation fans is the same as the number of the battery cavities, and each heat dissipation fan is arranged in the first heat dissipation hole of the corresponding battery cavity.

In an embodiment of the backpack assembly of the disclosure, a receiving groove is further arranged between a bottom wall of the box body and the battery cavity to receive electronic components, a second air channel is further arranged between a side wall of the box body and the battery cavity, one end of the second air channel is communicated with the first heat dissipation hole, and the other end thereof is communicated with the receiving groove.

In an embodiment of the backpack assembly of the disclosure, the receiving groove is provided with a third heat dissipation hole communicating with the outside.

In an embodiment of the backpack assembly of the disclosure, the heat dissipation fan is a centrifugal fan, and includes a first vent and a second vent corresponding to the first vent, wherein an air inlet or an outlet direction of the first vent is perpendicular to an air outlet or an inlet direction of the second vent.

In an embodiment of the backpack assembly of the disclosure, the first vent is communicated with the first heat dissipation hole, and the second vent is communicated with the second air channel.

In an embodiment of the backpack assembly of the disclosure, the heat dissipation fan is located in the first air channel.

In an embodiment of the backpack assembly of the disclosure, a buffer mechanism matched with the battery pack is arranged in the battery cavity.

In an embodiment of the backpack assembly of the disclosure, the backpack assembly further includes an information acquisition unit and a display unit, the information acquisition unit is used to obtain power information of the battery pack, and the display unit is used to display the power information.

In an embodiment of the backpack assembly of the disclosure, the backpack assembly further includes a box cover matched with the box body, the box cover is provided with a first lock, and the box body is provided with a second lock matched with the first lock.

The disclosure further provides a backpack power assembly, the backpack power assembly includes a backpack assembly and a plurality of battery packs. Wherein, the backpack assembly is used to be carried by an operator. The backpack assembly includes a box body and a heat dissipation fan. The box body is provided with a first air channel communicating with the outside and a plurality of battery cavities located around the first air channel, the battery cavities is provided with a first heat dissipation hole and a second heat dissipation hole which corresponds to the first heat dissipation hole and communicates with the first air channel. The heat dissipation fan drives air to flow into the battery cavities from one of the first heat dissipation hole and the first air channel, and flow out of the battery cavity from the other of the first heat dissipation hole and the first air channel. The plurality of the battery packs are mounted in the plurality of the battery cavities.

The beneficial effects of the present disclosure are: the backpack blower of the disclosure provides the motor duct assembly in the air outlet assembly, so that when the air enters, the air passes through the elbow to reduce the air speed, which is beneficial to reduce noise. And when the air is blown, it will not go through the elbow, which avoids the air from the elbow and reducing the air speed, so that the air outlet efficiency is higher.

DETAILED DESCRIPTION

Figure 1:
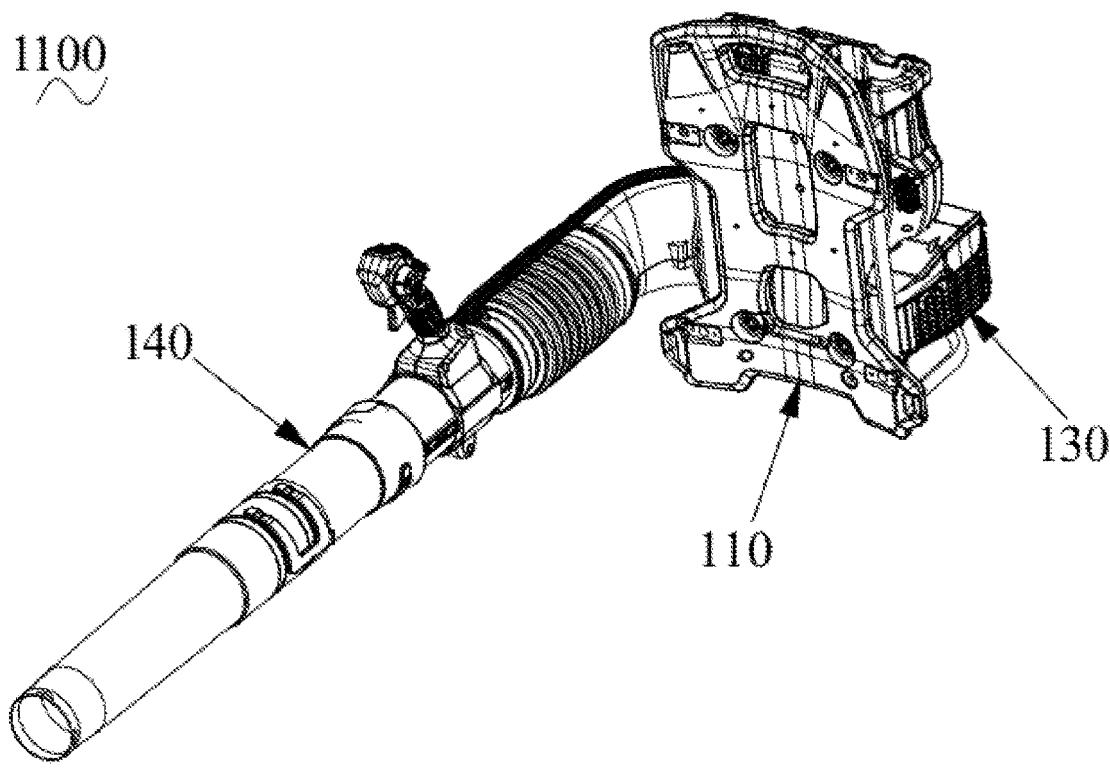
FIG. 1 is a perspective view of a first embodiment of a backpack blower of the disclosure.
Figure 2:
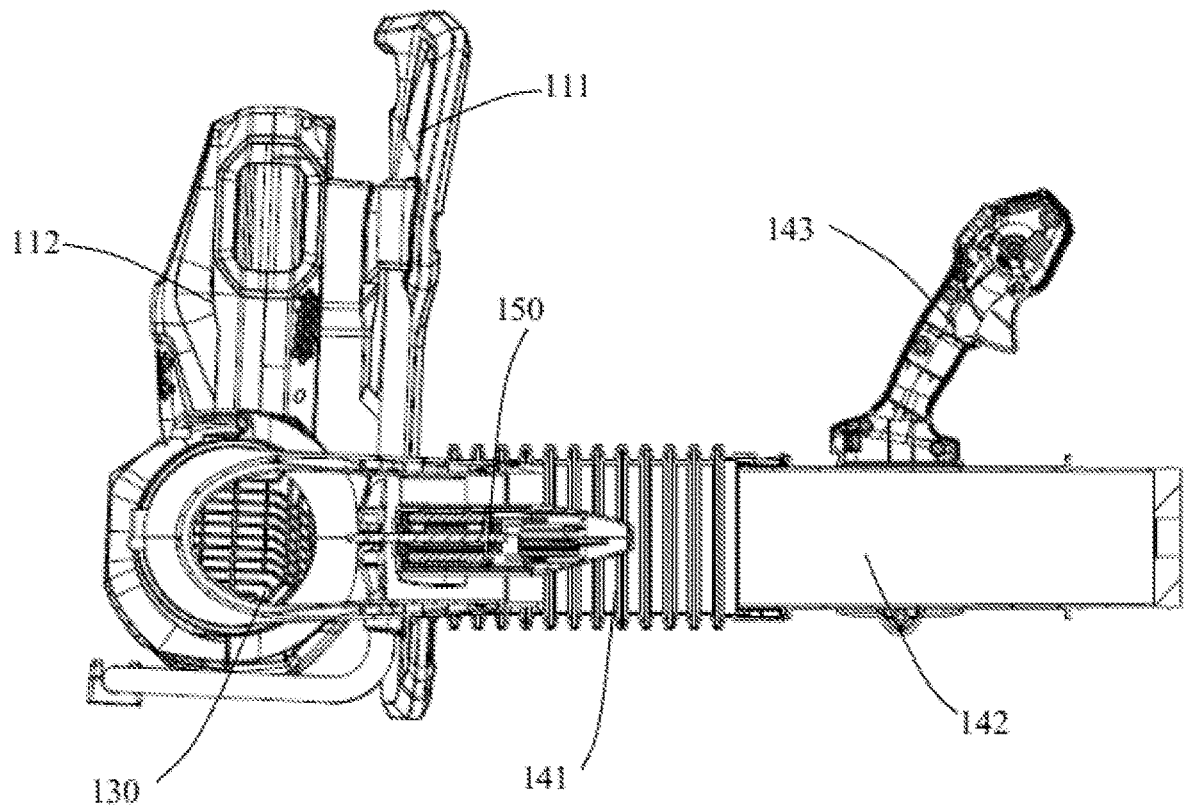
FIG. 2 is a cross-sectional view of the backpack blower shown in FIG. 1.
Figure 3:
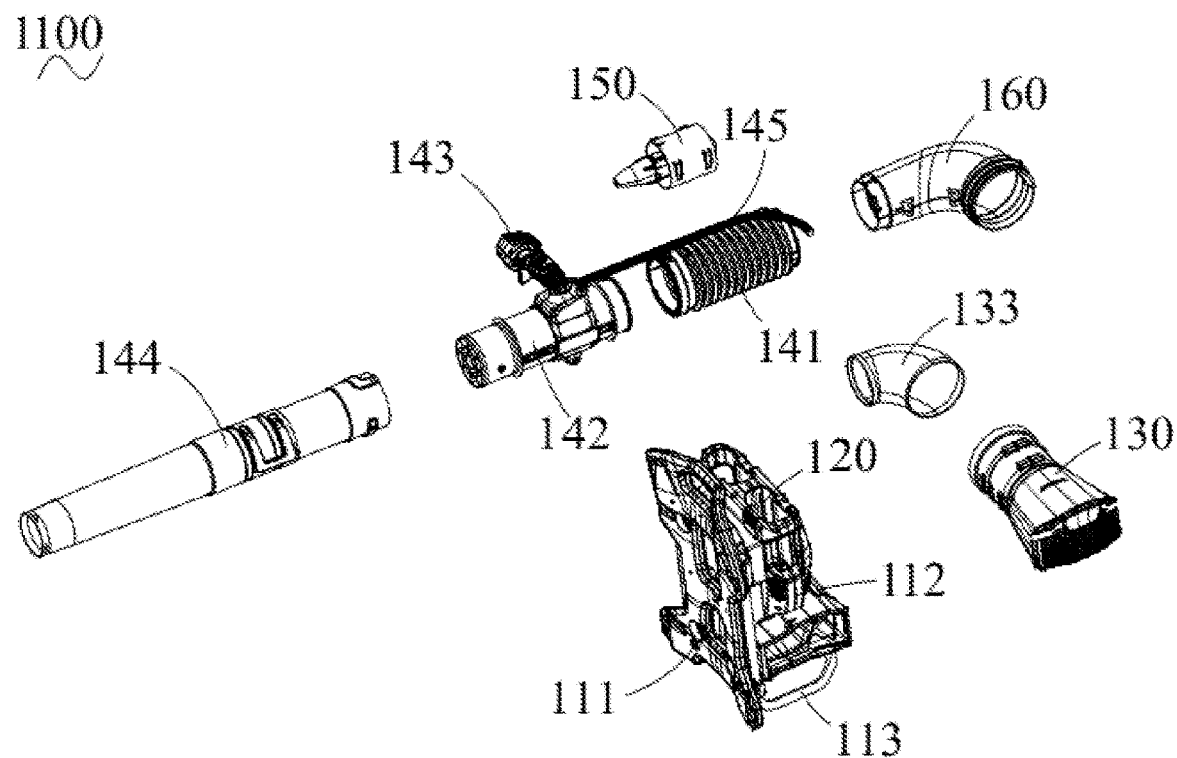
FIG. 3 is a partial exploded view of the backpack blower shown in FIG. 1.
Figure 4:
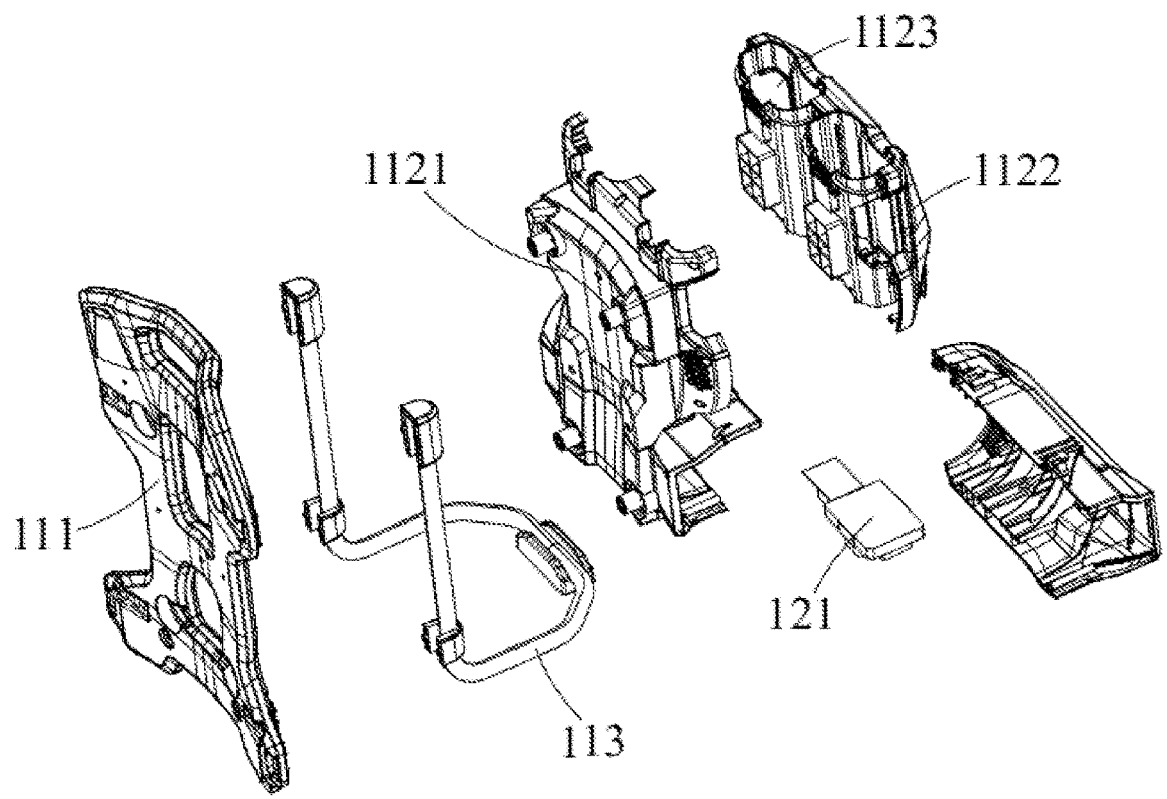
FIG. 4 is an exploded view of a backpack assembly in FIG. 3.
Figure 5:
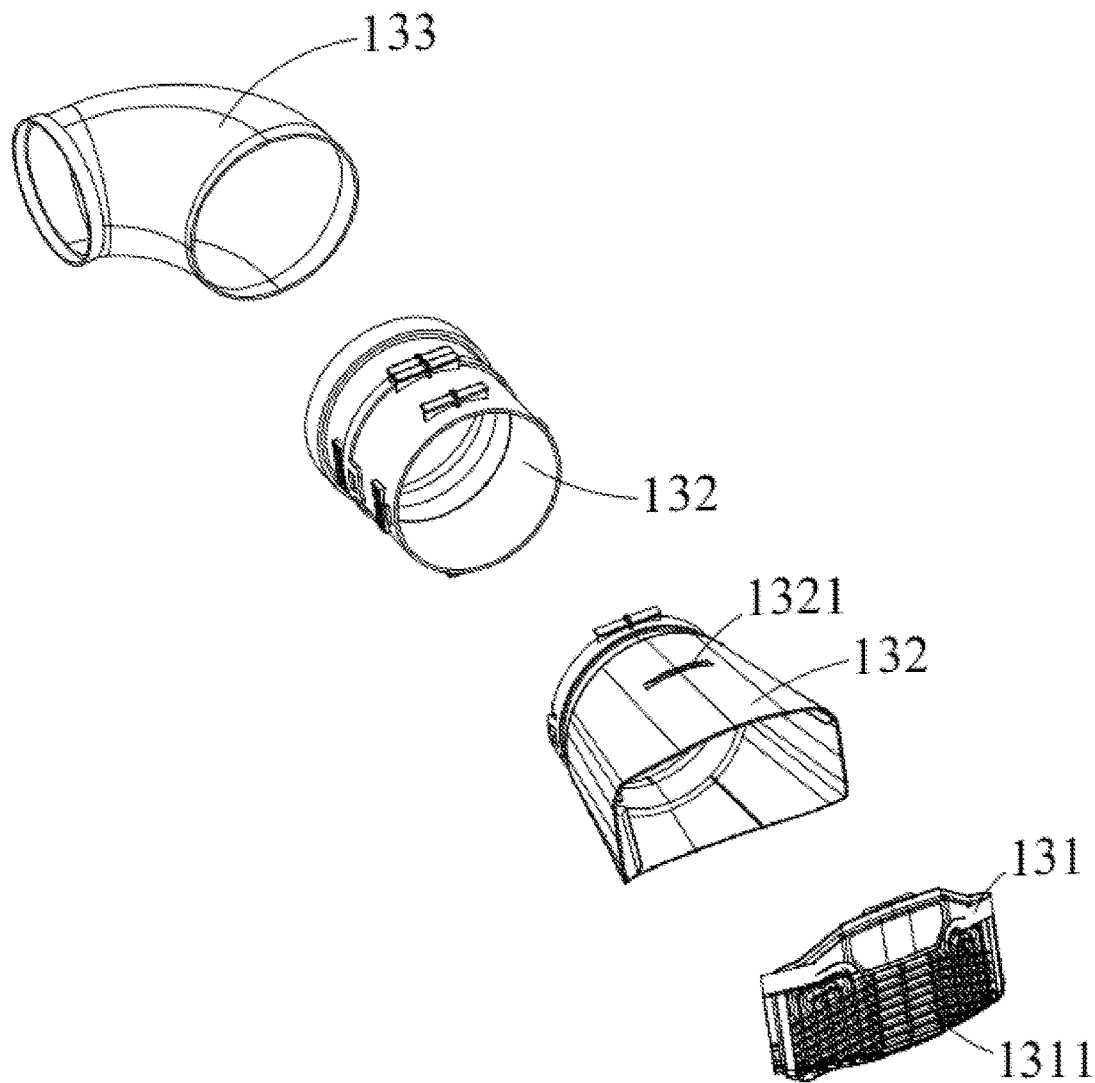
FIG. 5 is an exploded view of an air inlet assembly in FIG. 3.
Figure 6:
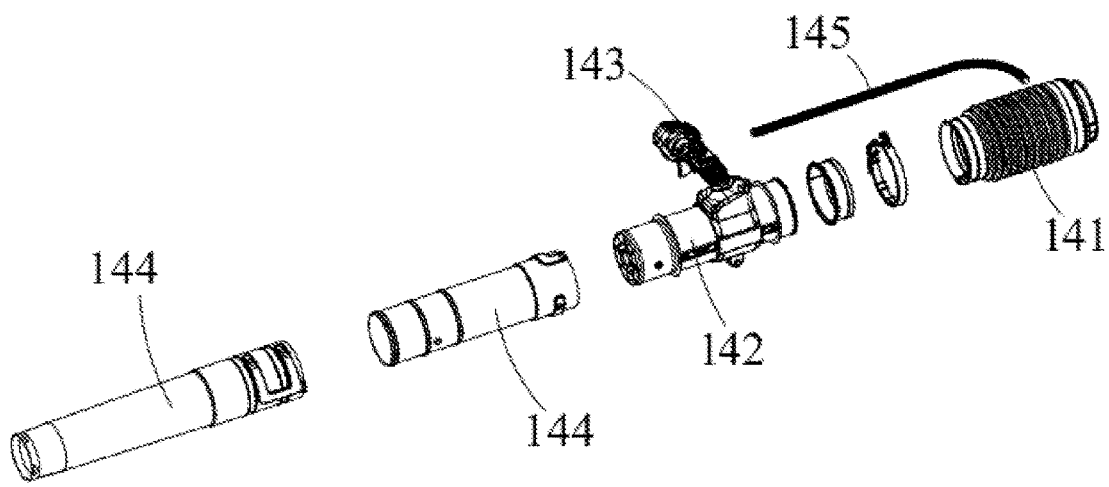
FIG. 6 is an exploded view of an air outlet assembly in FIG. 3.
Figure 7:
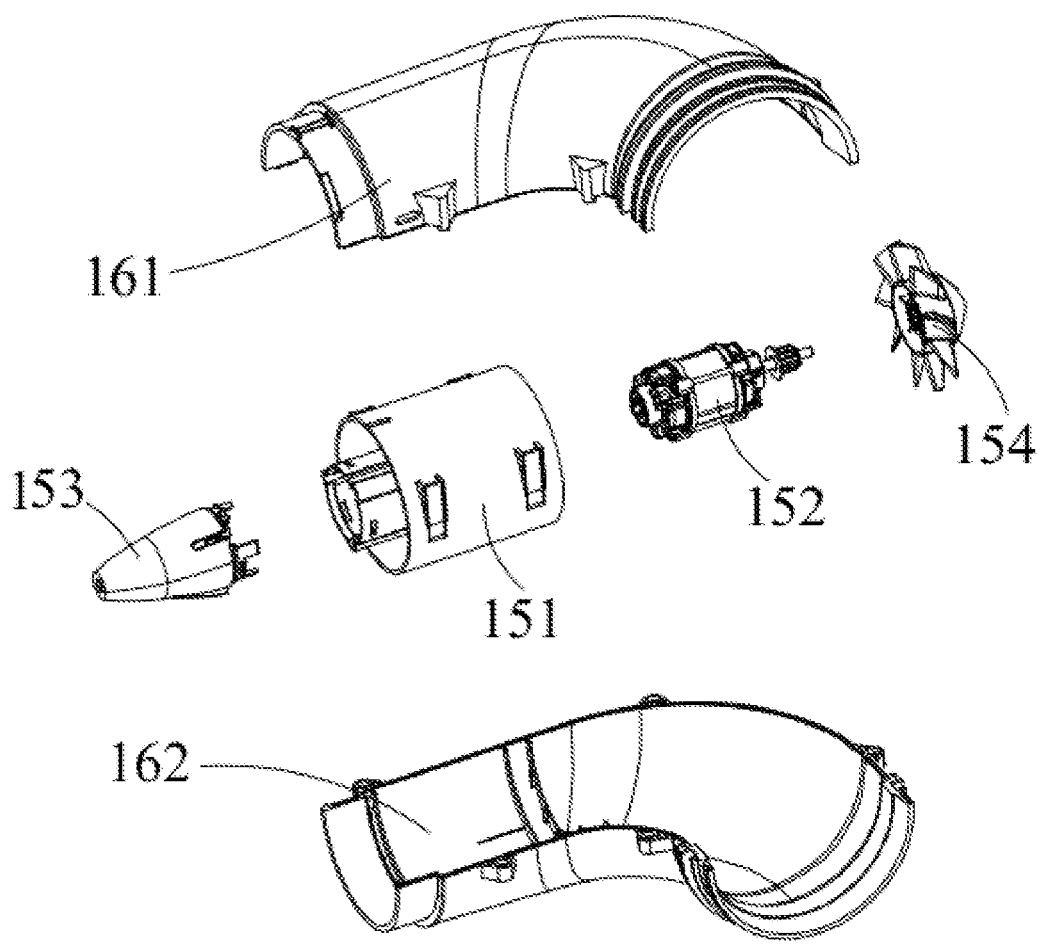
FIG. 7 is an exploded view of a motor duct assembly and a housing assembly in FIG. 3.
Figure 8:
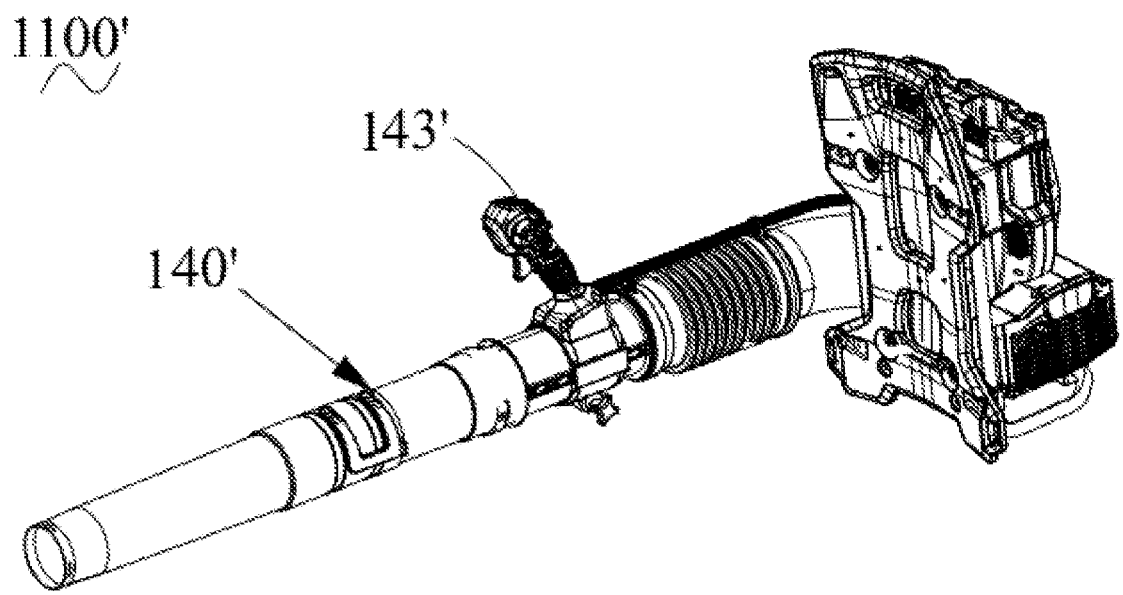
FIG. 8 is a perspective view of a second embodiment of a backpack blower of the disclosure.
Figure 9:
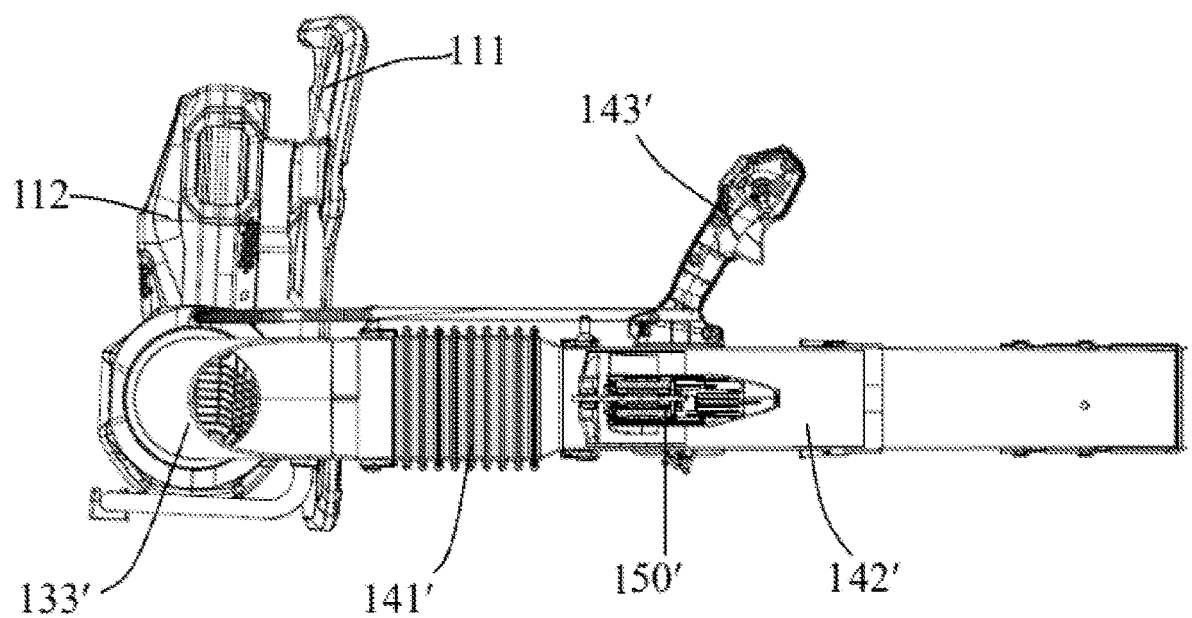
FIG. 9 is a cross-sectional view of the backpack blower shown in FIG. 8.
Figure 10:
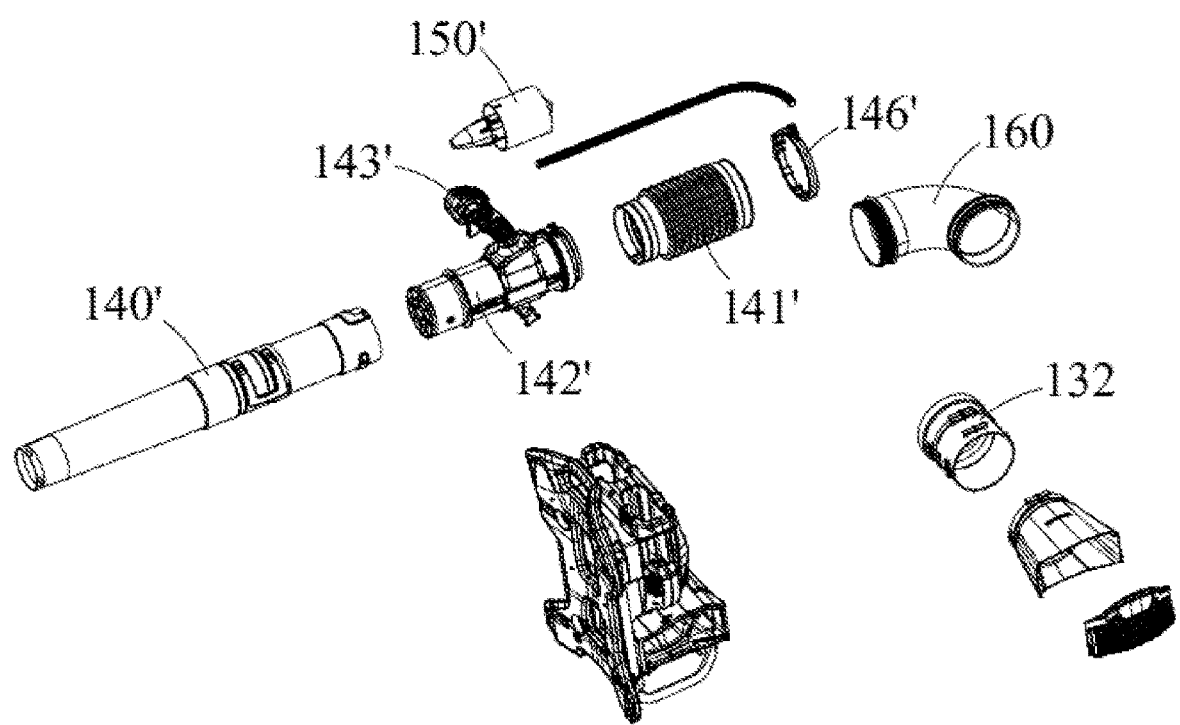
FIG. 10 is an exploded view of the backpack blower shown in FIG. 9.
Figure 11:
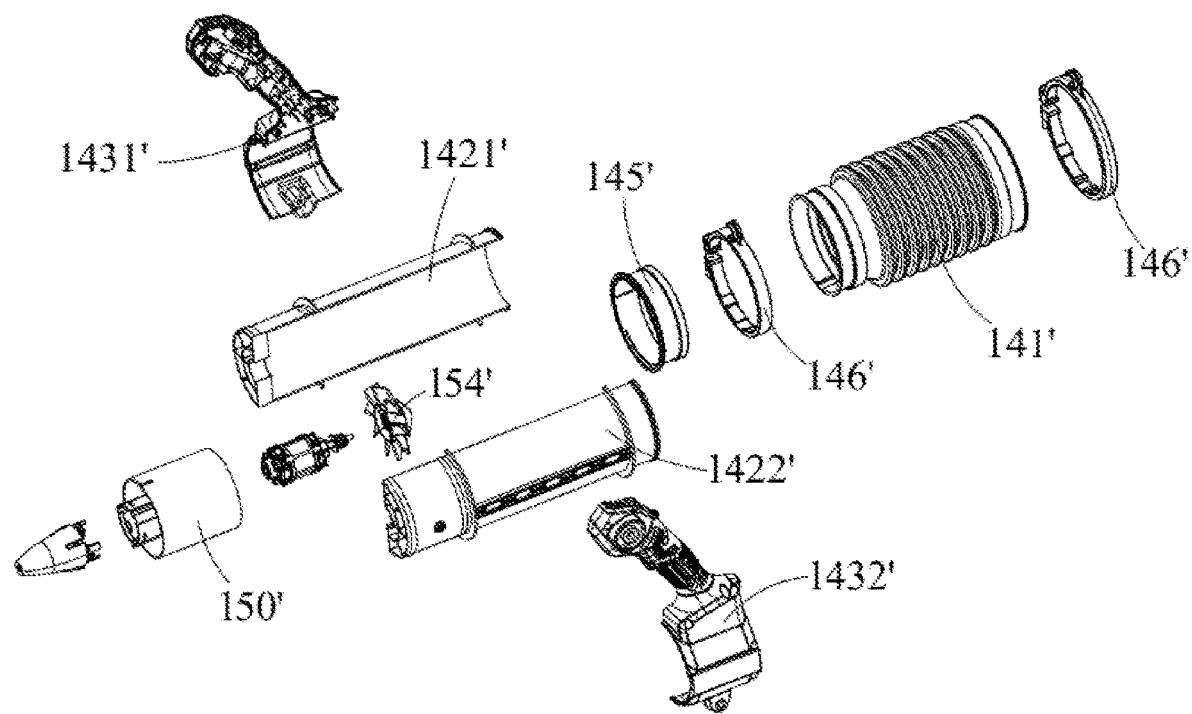
FIG. 11 is an exploded view of a motor duct assembly and part of an air outlet assembly in FIG. 10.

In order to make the objectives, technical solutions and advantages of the disclosure clearer, the disclosure will be described in detail below with reference to the drawings and specific embodiments.

Please refer to FIG. 1 through FIG. 7, it is a first embodiment of a backpack blower 1100 of the disclosure. In this embodiment, the backpack blower 1100 includes a backpack assembly 110, a power assembly 120 mounted in the backpack assembly 110, an air inlet assembly 130 mounted and fixed with the backpack assembly 110, and an air outlet assembly 140 connected with the air inlet assembly 130.

The backpack assembly 110 is used to be carried by an operator. The power assembly 120 includes a battery pack. The battery pack is detachably mounted on the backpack assembly 110. The backpack assembly 110 includes a back plate 111, a back strap (not shown), a casing 112 mounted and matched with the back plate 111, and a bracket 113 mounted and fixed with the back plate 111 to support the casing 112. The casing 112 is assembled and fixed with one side wall of the back plate 111. The back strap could be arranged on the other side wall of the back plate 111. When the back strap surrounds the operator's body, the other side wall of the back plate 111 fits the operator's back. A cross section of the bracket 113 is roughly L-shaped. On one hand, it realizes a fixed connection between the bracket 113 and the back plate 111, and on the other hand, the bracket 113 is used to support the casing 112 and the air inlet assembly 130. And when the backpack blower 1100 is in a non-working state, the backpack blower 1100 can be stably placed on the ground by the bracket 113.

The casing 112 includes a first casing 1121 and a second casing 1122 that are assembled and fixed with each other. The power assembly 120 is mounted in a receiving space (not labeled) surrounded and defined by the first casing 1121 and the second casing 1122. The power assembly 120 is used to supply power to a motor 152 below. The power assembly 120 is carried on the back of an operator through the backpack assembly 110, and includes a battery pack (not shown) and a circuit board 121 located below the battery pack. The circuit board 121 is electrically connected with the motor 152 and the battery pack, and power output by the battery pack is transferred to the circuit board 121 and then to the motor 152 to supply power to a blower body. A battery pack cavity 1123 for housing the battery pack is defined in the second casing 1122, and the battery pack is detachably slidably inserted into the battery pack cavity 1123. In this embodiment, there are two battery packs and two battery pack cavities 1123, but it should not be limited to this.

The air inlet assembly 130 is arranged below the battery pack cavity 1123 and includes an air window 131 and the air window 131 is mounted on an air inlet tube 132. The air outlet assembly 140 includes an inner tube 133, and the inner tube 133 is mainly used to connect with the air inlet tube 132. A plurality of air inlets 1311 are arranged on the air window 131. The air inlets 1311 communicate with an inner cavity of the air inlet tube 132 and an inner cavity of the inner tube 133 to define a whole air inlet channel. The inner tube 133 is arranged in a curved shape. In this embodiment, the inner tube 133 and the air inlet tube 132 are not contact directly, and the inner tube 133 is directly attached to an inner side wall of a housing assembly 160 below.

In order to reduce noise during air intake, a noise reduction sponge (not shown) is arranged on an inner side wall of the air inlet tube 132. A top wall of the air inlet tube 132 is provided with a heat dissipation hole 1321, and the heat dissipation hole 1321 is arranged corresponding to the circuit board 121 to increase air flow at the position of the circuit board 121, so that the heat generated during the operation of the circuit board 121 can be dissipated through the heat dissipation holes 1321, which reduces temperature of the circuit board 121.

The backpack blower 1100 further includes a motor duct assembly 150. The motor duct assembly 150 is housed in the air outlet assembly 140 and extends away from the air inlet tube 132. A power source of the motor duct assembly 150 is provided by the power assembly 120. The motor duct assembly 150 includes a duct body 151, a motor 152 fixed inside the duct body 151, a guiding cone 153 mounted and matched with one end of the duct body 151, and a fan blade 154 mounted and matched with the other end of the duct body 151. One end of the duct body 151 where the fan blade 154 is mounted is connected with the inner tube 133, and the duct body 151 extends toward the air outlet assembly 140, so that the end of the duct body 151 where the guiding cone 153 is mounted is located in the air outlet assembly 140. The fan blade 154 is fixed and mounted on a motor shaft of the motor 152. With this arrangement, when the motor 152 is started, the fan blade 154 will be driven to rotate, a negative pressure will be generated at the air inlet 1311, which promotes external air to enter the air inlet tube 132 through the air inlet 1311 and flow to the motor duct assembly 150 along the air inlet channel, and then flows out along the air outlet assembly 140 under the action of the guiding cone 153.

In this embodiment, the motor duct assembly 150 is assembled in the air outlet assembly 140, so that when air enters, the air speed will be reduced after the air passes through the curved inner tube 133, which is beneficial to reduce noise. Compared with conventional blowers in which the motor duct assembly is assembled in the backpack assembly, the airflow will not pass through the curved inner tube 133 when blowing, which avoids the reduction of the air speed when the air flow out from the curved tube, so that parameters are better and efficiency is higher.

The air outlet assembly 140 further includes a bellows 141 connected with the inner tube 133, an air outlet tube 142 fixed and connected with the bellows 141, a handle assembly 143 mounted on the air outlet tube 142, and a blowing tube 144 connected to the air outlet tube 142. A cross-sectional area of one end of the bellows 141 close to the air outlet tube 142 is smaller than a cross-sectional area of the other end of the bellows, and a smaller air outlet area can be obtained, which is beneficial to increase the air speed. A ratio of the cross-sectional area of the free end of the blowing tube 144 to a cross-sectional area of the duct body 151 is less than 0.8, so that the backpack blower 1100 can obtain a greater air speed.

Part of the motor duct assembly 150 is housed in the inner tube 133, and the other part of the motor duct assembly 150 is housed in the bellows 141. Specifically, one end of the duct body 151 where the fan blade 154 is mounted is connected with the inner tube 133, and the fan blade 154 is placed in the inner tube 133. One end of the duct body 151 where the guiding cone 153 is mounted is placed in the bellows 141. The backpack blower 1100 further includes a housing assembly 160 that is arranged outside the motor duct assembly 150 and the inner tube 133. The inner tube 133 is bent. The housing assembly 160 is bent correspondingly. One end of the housing assembly 160 is threadedly connected with the air inlet tube 132, and the other end of the housing assembly 160 extends into the bellows 141 and is fixed and connected with the bellows 141.

Specifically, the housing assembly 160 includes an upper housing 161 and a lower housing 162 that are assembled up and down. Part of the motor duct assembly 150 and the inner tube 133 are housed in the receiving cavity of the upper housing 161 and the lower housing 162. Since the housing assembly 160 needs to completely cover the inner tube 133, both the upper housing 161 and the lower housing 162 need to be set to be bent, and a size of the upper housing 161 and the lower housing 162 needs to be larger than a size of the inner tube 133. In order to fix and connect the air inlet assembly 130 with the air outlet assembly 140, one end of the upper housing 161 and the lower housing 162 is provided with external threads to match internal threads on the air inlet tube 132 to realize the locking and fixing of the housing assembly 160 with the air inlet assembly 130. The other ends of the upper housing 161 and the lower housing 162 are clamped and fixed with the bellows 141 to realize the locking and fixing of the housing assembly 160 with the air outlet assembly 140. Of course, there can be many ways of fixing, which will not be described in detail here.

The handle assembly 143 is used for the operator to grasp and start the backpack blower 1100, and the handle assembly 143 is connected with the power assembly 120 (specifically the circuit board 121) through a control line 145, so as to realize a normal start of the backpack blower 1100. Since the specific structure of the handle assembly 143 and the connection relationship between the handle assembly 143 and the circuit board 121 can be realized through conventional technical solutions, it will not be described in detail and limited here.

The blowing tube 144 is connected to an end of the air outlet tube 142, and the inner cavity of the blowing tube 144 defines an air outlet channel for air outlet. In this embodiment, the blowing tube 144 includes two parts which are assembled in an up and down direction. On one hand, the air outlet channel of the blowing tube 144 can be extended according to actual needs. On the other hand, it can be disassembled and stored after use, which is very convenient. Of course, in other embodiments, only a part of the blowing tube 144 may be arranged, and a design of the other part is cancelled, which is not limited here.

Please refer to FIG. 8 through FIG. 11, it is a second embodiment of the backpack blower of the disclosure. In the second embodiment, a structure of a backpack blower 1100' is substantially the same as a structure of the backpack blower 1100, and the main differences are: in this embodiment, a motor duct assembly 150' is housed in an air outlet tube 142' and is located below a handle assembly 143', and a fan blade 154' is arranged close to a bellows 141'. In this way, during an operation of the backpack blower 1100', air directly passes through the motor duct assembly 150' and is blown out from the air outlet assembly 140' without passing through the bellows 141', so a loss of air speed and air volume is smaller. The situation when the air enters is the same as in the first embodiment, and will not be described here.

Specifically, the air outlet tube 142' includes a first air outlet tube 1421' and a second air outlet tube 1422' which are assembled and matched with each other in a left-right direction (which means the left-right direction during a normal operation, and the same below). The motor duct assembly 150' is housed in a receiving cavity surrounded and defined by the first air outlet tube 1421' and the second air outlet tube 1422'. The handle assembly 143' includes a first handle 1431' and a second handle 1432' that are assembled and matched in a left-right direction. The first handle 1431' is clamped on the first air outlet tube 1421', and the second handle 1432' is clamped on the second outlet tube 1422'. The air outlet tube 142' is fixed and connected with one end of the bellows 141' through a connecting ring 145' and a clamp 146', and the other end of the bellows 141' is also connected with one end of the housing assembly 160 through the clamp 146'. The other end of the housing assembly 160 is directly threadedly connected with the air inlet tube 132.

In addition, the inner tube 133 in the first embodiment is eliminated. Of course, the housing assembly 160 is still arranged in a curved shape at this time, so that the air speed and noise can be reduced during air inlet.

Although a use of a backpack battery pack to power the hand-held tool can reduce burden on users' arm and effectively improve endurance, there are also backpack blowers that cause higher temperature during battery pack discharge process due to higher power and current, which causes the battery pack discharging incompletely. In view of this, the disclosure further provides a new backpack assembly, which can quickly dissipate heat for a battery pack because it is provided with a heat dissipation system, thereby effectively ensuring that the battery pack can work normally.

Please refer to FIG. 12, FIG. 13, FIG. 14, and FIG. 15. The disclosure provides a backpack assembly 2100 for a user to carry a power assembly. The power assembly includes a plurality of battery packs for powering tools. The backpack assembly 2100 includes a box body 210, a box cover 220 matched with the box body 210, and a heat dissipation fan 230.

Figure 14:
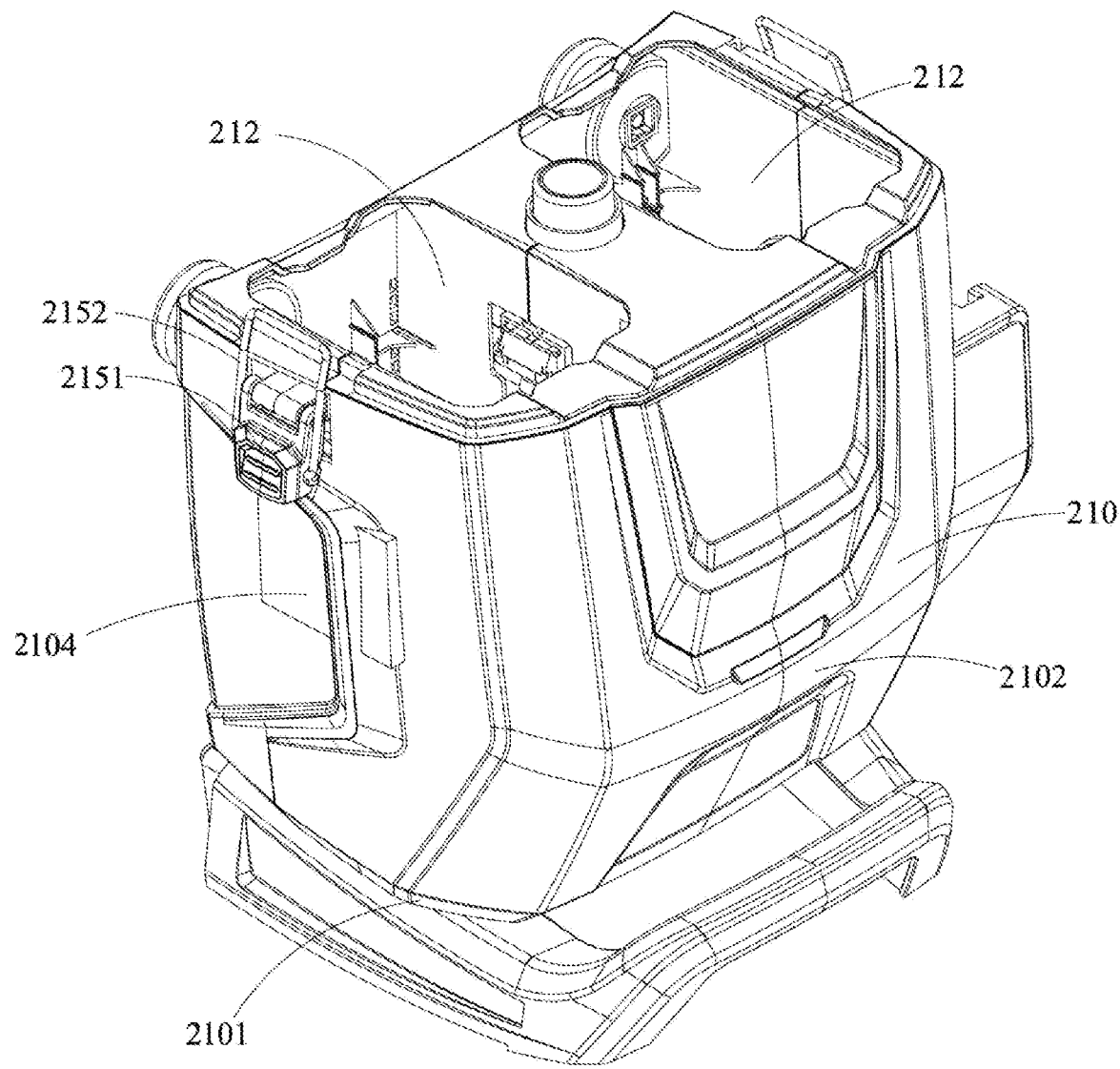
FIG. 14 is a perspective schematic view of the backpack assembly shown in FIG. 1 without a box cover.
Figure 15:
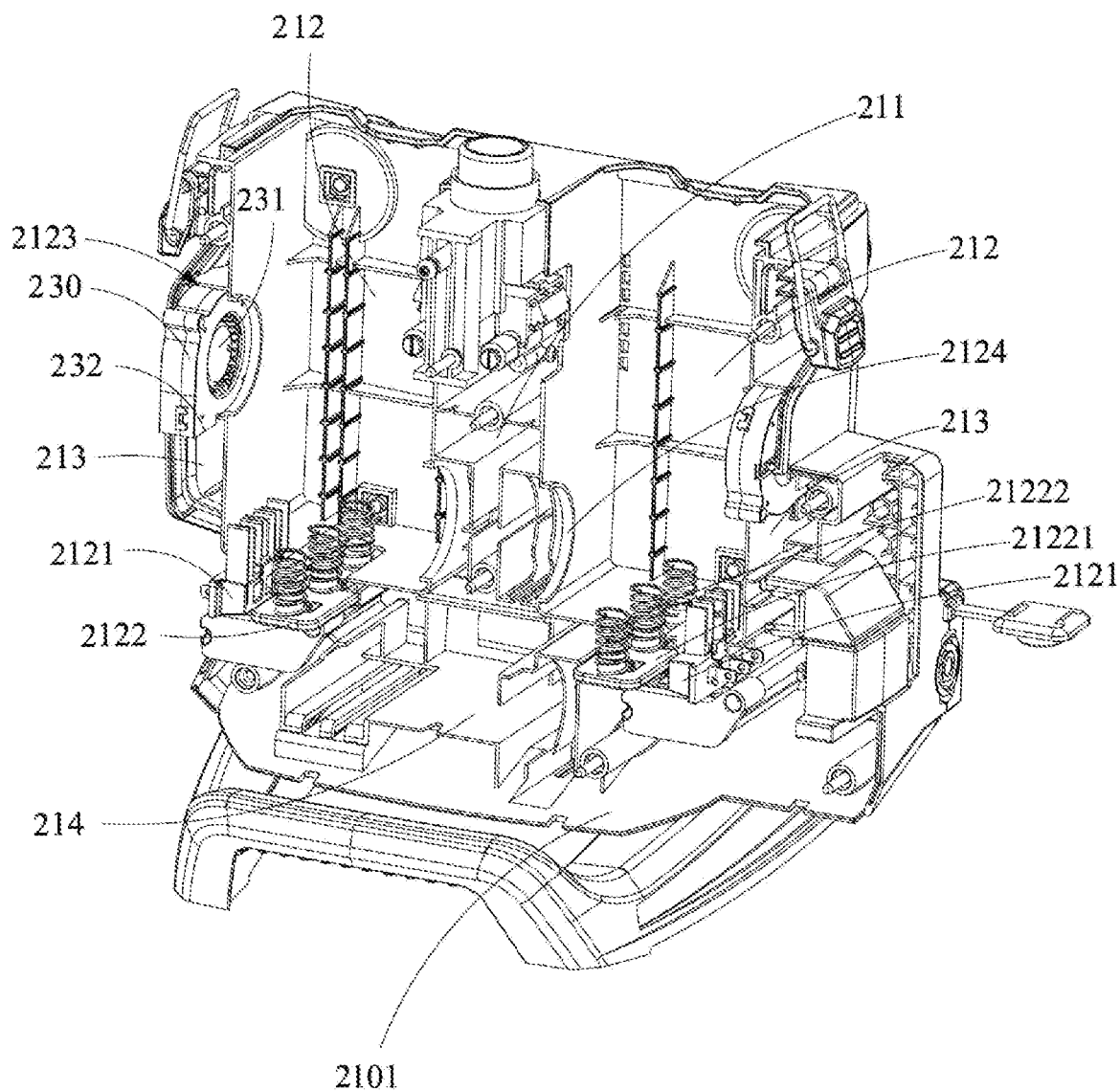
FIG. 15 is an internal schematic view of the backpack assembly shown in FIG. 1.

Please refer to FIG. 14 and FIG. 15, the box body 210 includes a bottom wall 2101, a front wall 2102, a rear wall 2103 arranged opposite to the front wall 2102, and a side wall 2104 located between the front wall 2102 and the rear wall 2103. The bottom wall 2101, the front wall 2102, the rear wall 2103, and the side wall 2104 jointly define a receiving space. The rear wall 2103 is provided with a fixing component 21031 to fix and mount a carrying mechanism (not shown) on the rear wall 2103 so as to facilitate users to carry the box body 210 on their back through the carrying mechanism. The carrying mechanism may be a back strap or a back plate with a back strap. The side wall 2104 is provided with a power output port 21041, so that the backpack assembly 2100 can output power in the battery pack to outside through the power output port 21041. The box body 210 is further provided with a first air channel 211 and a plurality of battery cavities 212. The first air channel 211 and the battery cavities 212 are located in the receiving space. The first air channel 211 communicates with outside. In this embodiment, the rear wall 2103 is further provided with a ventilation hole 21032 communicating with the first air channel 211, so that the first air channel 211 is connected with outside. Of course, it can be understood that, in other embodiments, the ventilation hole 21032 communicating with the first air channel 211 may also be arranged on any one of the bottom wall 2101, the front wall 2102, and the side wall 2104.

Please refer to FIG. 14 and FIG. 15, the battery cavities 212 are used for storing battery packs. The plurality of the battery cavities 212 are located around the first air channel 211. A bottom wall of the battery cavity 212 is provided with a connecting port 2121 and a buffer mechanism 2122. The connecting port 2121 is used to match the battery pack to obtain power from the battery pack and transmit the power to the power output port 21041 so as to output power to outside through the power output port 21041. The buffer mechanism 2122 is used to match the battery pack to buffer the battery pack, so that a rigid collision between the battery pack and the battery cavity 212 will be prevented. The buffer mechanism 2122 includes a fixed plate 21221 fixed and mounted in the battery cavity 212 and an elastic component 21222 mounted on the fixed plate 21221. When a user puts a battery pack into the battery cavity 212, the battery pack slides along the battery cavity 212 and resists the elastic component 21222. At this time, the elastic component 21222 is elastically deformed under the action of the battery pack, and at the same time plays a buffering effect on the battery pack to prevent the battery pack from rigidly colliding with the battery cavity 212. In this embodiment, the elastic component 21222 is a spring. However, in other embodiments, the elastic component 21222 may also be made of other elastic materials, such as elastic pins, elastic plastics, etc. The side wall of the battery cavity 212 is provided with a first heat dissipation hole 2123 and a second heat dissipation hole 2124 corresponding to the first heat dissipation hole 2123. The first heat dissipation hole 2123 directly or indirectly communicates with outside. The second heat dissipation hole 2124 communicates with the first air channel 211.

Figure 18:
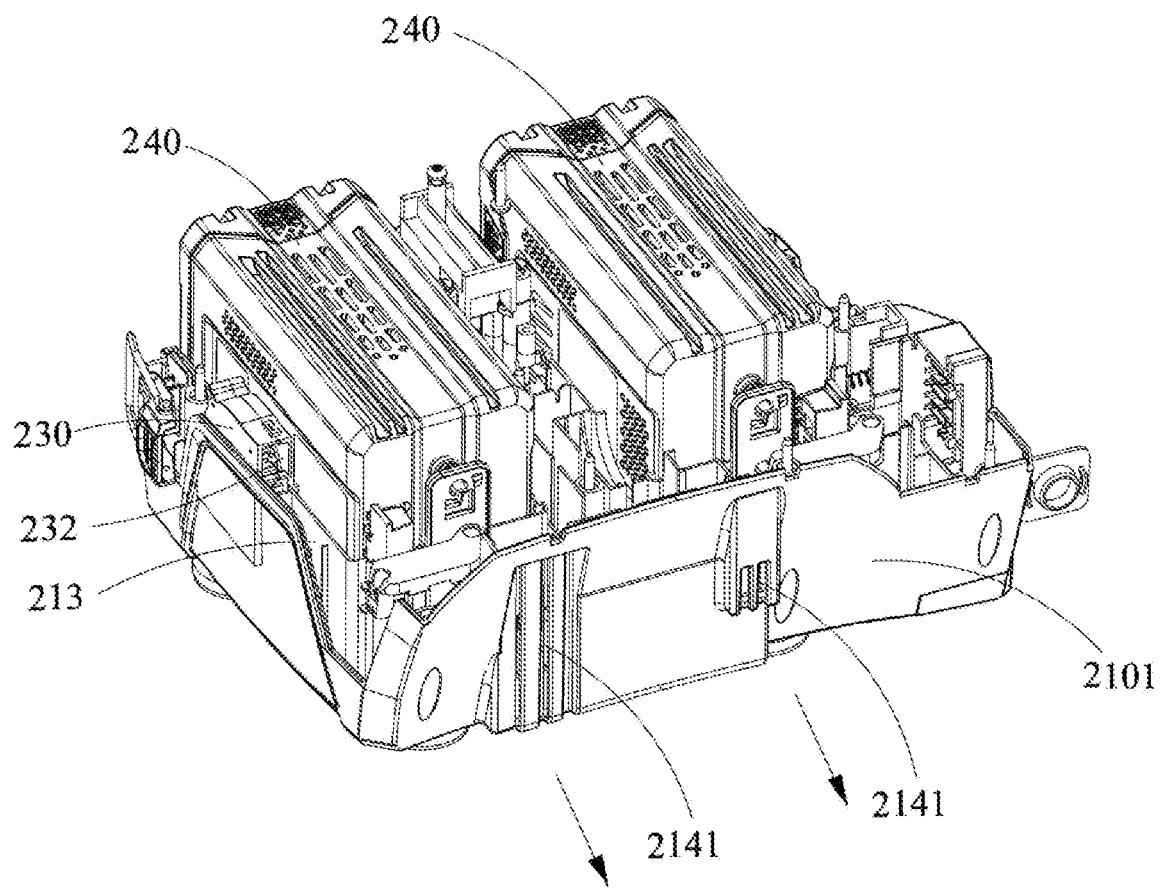
FIG. 18 is a bottom schematic view of the backpack assembly matched with the battery pack.

Please refer to FIG. 15, the box body 210 is further provided with a second air channel 213 and a receiving groove 214. The second air channel 213 is located between the battery cavity 212 and the side wall 2104. One end of the second air channel 213 is communicated with the first heat dissipation hole 2123, and the other end of the second air channel 213 is communicated with the receiving groove 214. Although in this embodiment, the second air channel 213 is located between the battery cavity 212 and the side wall 2104, in other embodiments, the second air channel 213 may also be arranged between the battery cavity 212 and the front wall 2102, or between the battery cavity 212 and the rear wall 2103. The receiving groove 214 is located between the battery cavity 212 and the bottom wall 2101 for housing electronic components, such as control circuits. The receiving groove 214 is provided with a third heat dissipation hole 2141 communicating with outside, so that the electronic components in the receiving groove 214 can dissipate heat. In this embodiment, as shown in FIG. 18, the third heat dissipation hole 2141 is arranged on the bottom wall 2101. However, in other embodiments, the third heat dissipation hole 2141 may also be arranged on a side wall of the receiving groove 214.

Figure 12:
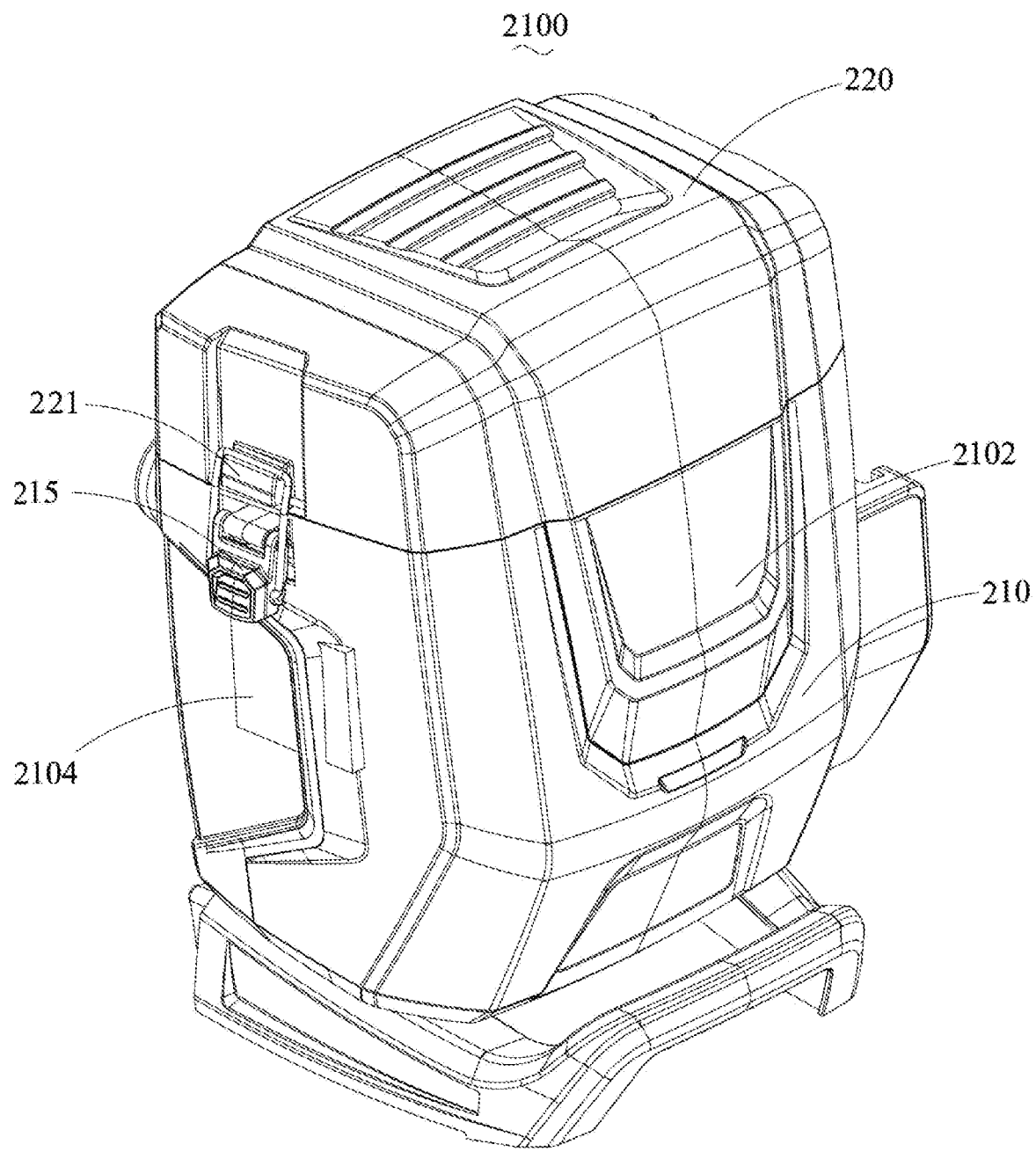
FIG. 12 is a perspective schematic view of a backpack assembly of the disclosure.
Figure 13:
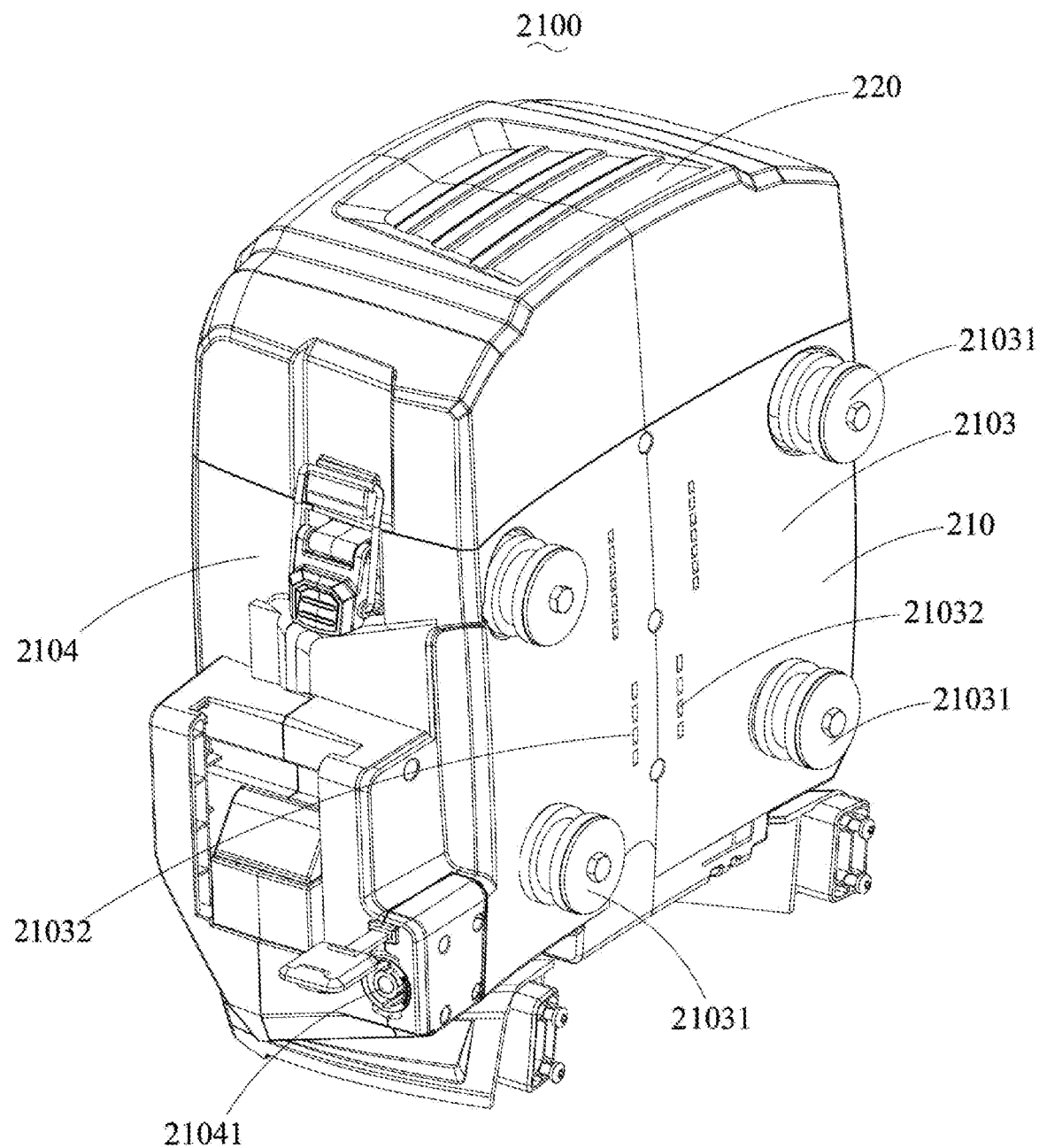
FIG. 13 is a perspective schematic view of the backpack assembly shown in FIG. 1 from another angle.

Please refer to FIG. 12, FIG. 13 and FIG. 14, the box cover 220 is used to match the box body 210 to seal the receiving space, thereby protecting the battery pack housed in the battery cavity 212. The box cover 220 is provided with a first lock 221, and the box body 210 is provided with a second lock 215. The first lock 221 matches the second lock 215 to fix the box cover 220 on the box body 210. In this embodiment, the first lock 221 is a clasp groove. The second lock 215 includes a handle 2151 pivotally mounted on the box body 210, and a clasp arm 2152 pivotally mounted on the handle 2151 and matched with the clasp groove. When in use, first the handle 2151 is turned upwards, and the clasp arm 2152 is housed in the clasp groove. And then the handle 2151 is turned downwards, the clasp arm 2152 buckles the clasp groove so that the box cover 220 is fixed on the box body 210.

Please refer to FIG. 15, the heat dissipation fan 230 is used to drive air flow into the battery cavity 212 from one of the first heat dissipation hole 2123 and the first air channel 211 and flow out of the battery cavity 212 from the other of the first heat dissipation hole 2123 and the first air channel 211. In this way, heat of the battery pack in the battery cavity 212 is dissipated, so that the battery pack in the battery cavity 212 can work normally. The number of the heat dissipation fans 230 is the same as the number of the battery cavities, and each heat dissipation fan 230 is arranged in the first heat dissipation hole 2123 of the corresponding battery cavity 212. The heat dissipation fan 230 is a centrifugal fan, and includes a first vent 231 and a second vent 232 corresponding to the first vent 231. An air inlet/outlet direction of the first vent 231 is perpendicular to an air outlet/inlet direction of the second vent 232. The first vent 231 communicates with the first heat dissipation hole 2123, and the second vent 232 communicates with the second air channel 213. Although in this embodiment, the heat dissipation fan 230 is arranged in the first heat dissipation hole 2123, in other embodiments, the heat dissipation fan 230 may also be arranged in the first air channel 211.

Figure 16:
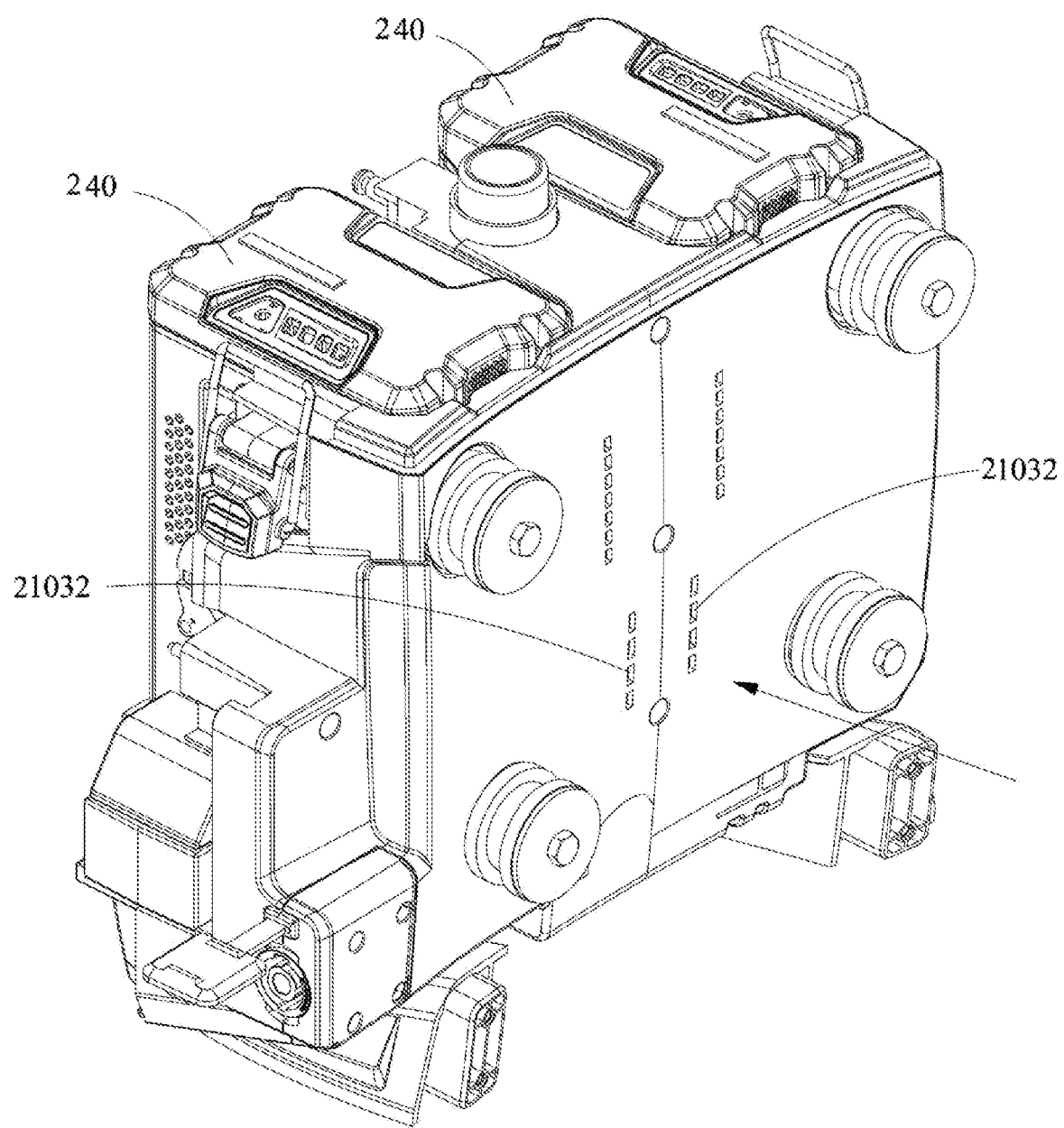
FIG. 16 is a schematic view of the backpack assembly matched with a battery pack.
Figure 17:
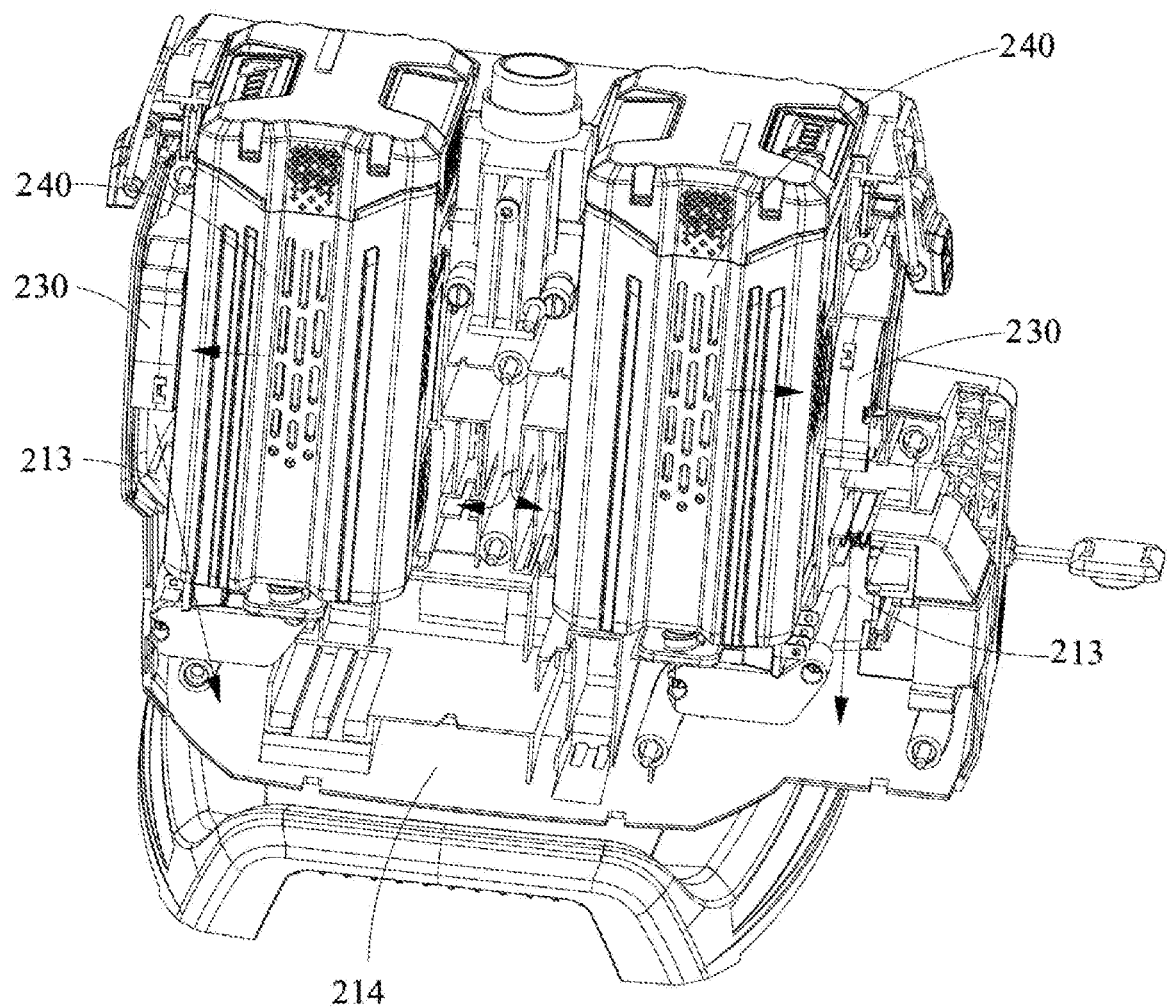
FIG. 17 is an internal schematic view of the backpack assembly matched with the battery pack.

Please refer to FIG. 16, FIG. 17, and FIG. 18, when in use, the heat dissipation fan 230 drives air to flow from the ventilation hole 21032 into the first air channel 211, and enters the battery cavity 212 through the first air channel 211, thereby dissipating heat of the battery pack 240 located in the battery cavity 212. Then, the air passes through the heat dissipation fan 230, flows into the second air channel 213 and enters the receiving groove 214 for heat dissipation of the electronic components in the receiving groove 214. Finally, the air is discharged to outside through the third heat dissipation hole 2141.

Preferably, the backpack assembly 2100 is further provided with an information acquisition unit (not shown) and a display unit (not shown). The information acquisition unit performs handshake communication with the battery pack in the battery cavity 212 through the connecting port 2121, thereby acquiring power information of the battery pack, and displaying the power information through the display unit. This arrangement is convenient for a user to judge whether the remaining power meets the demand, whether the battery pack needs to be precharged, etc. according to the power information of the battery pack.

Compared with the conventional art, since the backpack assembly 2100 of the disclosure is provided with a heat dissipation system, it can quickly dissipate heat for the battery pack, thereby effectively ensuring that the battery pack can work normally.

Figure 19:
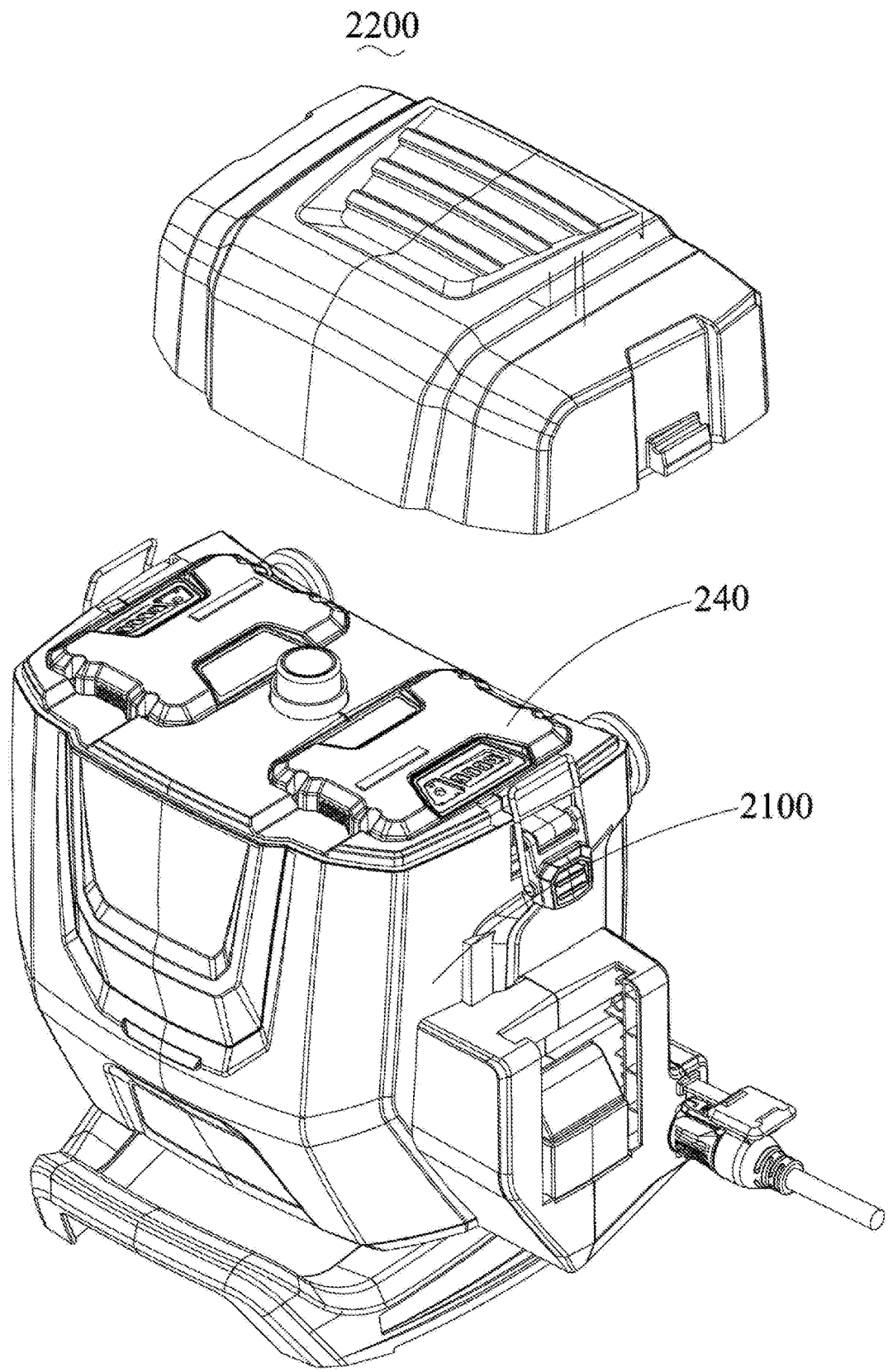
FIG. 19 is a perspective schematic view of a backpack power assembly of the disclosure.

Please refer to FIG. 19. The disclosure further provides a backpack power assembly 2200, the backpack power assembly includes a plurality of battery packs 240 and any one of the above-mentioned backpack assembly 2100. The battery packs 240 are housed in the battery cavities 212.

Figure 20:
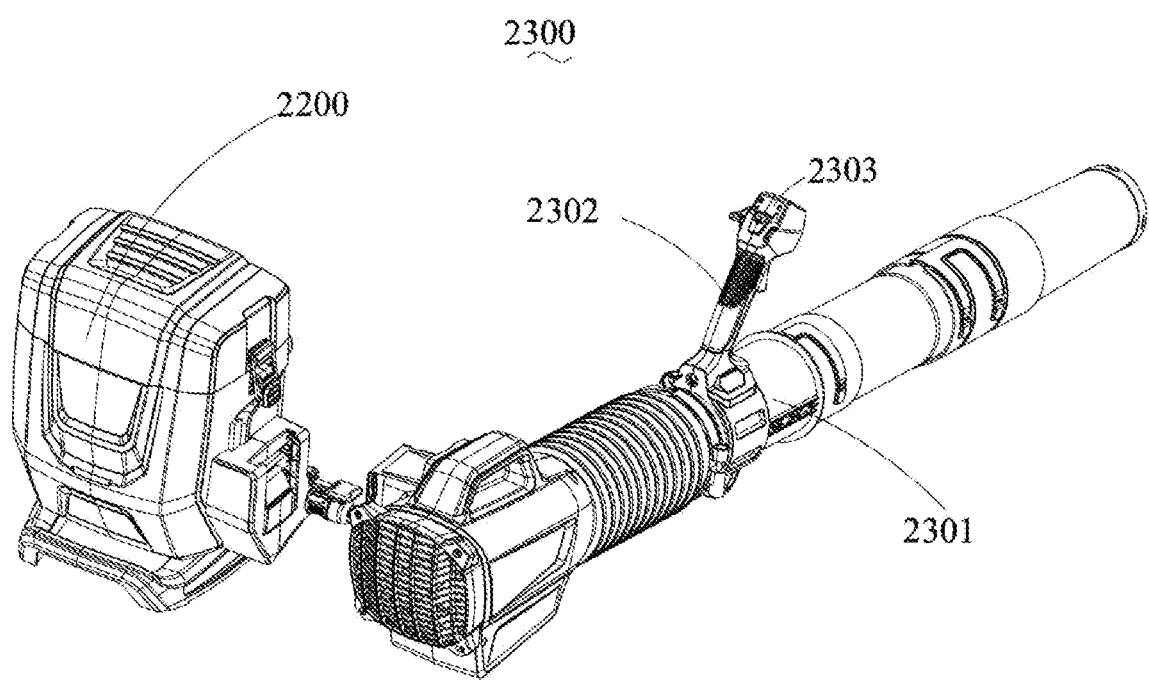
FIG. 20 is a perspective schematic view of a blower of the disclosure.

Please refer to FIG. 20, the disclosure further provides a blower 2300. The blower 2300 includes a blower body 2301 and the backpack power assembly 2200. The blower body 2301 is provided with an input port (not shown), an operating handle 2302, and a display unit 2303 located on the operating handle 2302. The blower body matches the power output port 21041 through the input port, so as to obtain power of the backpack power assembly 2200 and power information of the battery pack 240 in the backpack power assembly 2200. The display unit 2303 is used to display the power information.

In summary, in the backpack blower 1100, 1100' of the disclosure, the motor duct assembly 150, 150' are arranged in the air outlet assembly 140, 140' and are away from the air inlet tube 132, so that when air enters, the air passes through the curved housing assembly 160 and the air speed is reduced, which is beneficial to reduce the noise, and the air will not pass through the elbow when blowing. It avoids the reduction of the air speed when the air is discharged from the elbow, so that the air outlet efficiency is higher. Compared with the conventional art, the backpack blower 1100, 1100' of the disclosure has the advantages of lower air volume and air speed loss during operation, which is beneficial to reduce noise.

The above embodiments are only used to illustrate the technical solutions of the disclosure and not to limit them. Although the disclosure has been described in detail with reference to the preferred embodiments, those of ordinary skill in the art should understand that the technical solutions of the disclosure are capable of being modified or equivalently replaced without departing from the spirit and scope of the technical solution of the disclosure.

What is claimed is:

1. A backpack blower, comprising:
a backpack assembly, used to be carried by an operator, comprising a battery pack cavity, used to house a battery pack, and
a blower body, mounted on the backpack assembly, the battery pack supplying power to the blower body, wherein
the blower body comprises a motor duct assembly, an air inlet assembly mounted on the backpack assembly, and an air outlet assembly connected with the air inlet assembly, the air inlet assembly comprises an air inlet and an air inlet tube connected to the air inlet, the air inlet tube is connected with the air outlet assembly, the motor duct assembly is housed in the air outlet assembly, and
wherein the battery pack is located above the air inlet assembly and is carried on a back of an operator through the backpack assembly, a circuit board is located below the battery pack, a heat dissipation hole is arranged on a top wall of the air inlet tube, and the heat dissipation hole is arranged corresponding to the circuit board, so as to dissipate heat generated during an operation of the circuit board through the heat dissipation hole.

2. The backpack blower according to claim 1, wherein the motor duct assembly comprises a duct body, a motor mounted inside the duct body, a guiding cone and a fan blade, the guiding cone is mounted and matched with one end of the duct body, the fan blade is mounted and matched with the other end of the duct body, and the fan blade is fixedly mounted on the motor shaft of the motor.

3. The backpack blower according to claim 2, wherein the air outlet assembly comprises a housing assembly, a bellows, an air outlet tube fixedly connected to the bellows, and a handle assembly mounted on the air outlet tube, the housing assembly is connected with the air inlet tube, and the bellows is connected with the housing assembly.

4. The backpack blower according to claim 3, wherein an inner tube is arranged in the housing assembly, a part of the motor duct assembly is housed in the inner tube, and the other part of the motor duct assembly is housed in the bellows, one end of the duct body mounted with the fan blade is connected with the inner tube, the fan blade is arranged in the inner tube, and one end of the duct body mounted with the guiding cone is arranged in the bellows.

5. The backpack blower according to claim 4, wherein the motor duct assembly and the inner tube are housed in the housing assembly, the inner tube is bent, the housing assembly is correspondingly bent, one end of the housing assembly is threadedly connected with the air inlet tube, and the other end extends into the bellows and is fixedly connected with the bellows.

6. The backpack blower according to claim 3, wherein the motor duct assembly is housed in the air outlet tube and located below the handle assembly, and the fan blade is arranged closer to an end of the bellows connected with the air outlet tube than an end of the bellows connected with the housinq assembly.

7. The backpack blower according to claim 6, wherein the air outlet tube comprises a first air outlet tube and a second air outlet tube that are assembled and matched with each other, the motor duct assembly is housed in a receiving cavity surrounded and defined by the first air outlet tube and the second air outlet tube, the handle assembly comprises a first handle and a second handle that are assembled and matched with each other, the first handle is clamped on the first air outlet tube, and the second handle is clamped on the second air outlet tube.

8. The backpack blower according to claim 3, wherein the air outlet assembly further comprises a blowing tube connected with the air outlet tube, a ratio of a cross-sectional area of a free end of the blowing tube to a cross-sectional area of the duct body is less than 0.8, and a cross-sectional area of one end of the bellows close to the air outlet tube is smaller than a cross-sectional area of the other end of the bellows.

9. The backpack blower according to claim 1, wherein a noise reduction sponge is arranged on an inner side wall of the air inlet tube to reduce noise when air enters.

10. The backpack blower according to claim 1, wherein the blower body is provided with an input port, and the backpack assembly is provided with a power output port matched with the input port.

11. The backpack blower according to claim 10, wherein the blower body is further provided with an operating handle and a display unit on the operating handle, the backpack assembly is further provided with an information acquisition unit, and the information acquisition unit is used to obtain power information of the battery pack and display the power information on the display unit through a match of the input port and the power output port.

12. A backpack assembly, comprising:
a box body, provided with a first air channel communicating with the outside and a plurality of battery cavities located around the first air channel, the battery cavities being provided with a first heat dissipation hole and a second heat dissipation hole which corresponds to the first heat dissipation hole and communicates with the first air channel, and
a heat dissipation fan, driving air to flow into the battery cavities from one of the first heat dissipation hole and the first air channel, and flow out of the battery cavity from the other of the first heat dissipation hole and the first air channel.

13. The backpack assembly according to claim 12, wherein
the number of the heat dissipation fans is the same as the number of the battery cavities, and each heat dissipation fan is arranged in the first heat dissipation hole of the corresponding battery cavity.

14. The backpack assembly according to claim 12, wherein
a receiving groove is further arranged between a bottom wall of the box body and the battery cavity to receive electronic components, a second air channel is further arranged between a side wall of the box body and the battery cavity, one end of the second air channel is communicated with the first heat dissipation hole, and the other end thereof is communicated with the receiving groove.

15. The backpack assembly according to claim 14, wherein
the receiving groove is provided with a third heat dissipation hole communicating with the outside; and
the heat dissipation fan is a centrifugal fan, and comprises a first vent and a second vent corresponding to the first vent, wherein an air inlet or an outlet direction of the first vent is perpendicular to an air outlet or an inlet direction of the second vent.

16. The backpack assembly according to claim 15, wherein
the first vent is communicated with the first heat dissipation hole, and the second vent is communicated with the second air channel.

17. The backpack assembly according to claim 12, wherein
the heat dissipation fan is located in the first air channel; and
a buffer mechanism matched with the battery pack is arranged in the battery cavity.

18. The backpack assembly according to claim 12, wherein
the backpack assembly further comprises an information acquisition unit and a display unit, the information acquisition unit is used to obtain power information of the battery pack, and the display unit is used to display the power information.

19. The backpack assembly according to claim 12, wherein
the backpack assembly further comprises a box cover matched with the box body, the box cover is provided with a first lock, and the box body is provided with a second lock matched with the first lock.

20. A backpack power assembly, comprising:
a backpack assembly, used to be carried by an operator, and
a plurality of battery packs, wherein
the backpack assembly comprising:
a box body, provided with a first air channel communicating with the outside and a plurality of battery cavities located around the first air channel, the battery cavities being provided with a first heat dissipation hole and a second heat dissipation hole which corresponds to the first heat dissipation hole and communicates with the first air channel, and
a heat dissipation fan, driving air to flow into the battery cavities from one of the first heat dissipation hole and the first air channel, and flow out of the battery cavity from the other of the first heat dissipation hole and the first air channel, and
the plurality of the battery packs are mounted in the plurality of the battery cavities.

* * * * *